US009119374B2

(12) United States Patent
Bracilovic et al.

(10) Patent No.: US 9,119,374 B2
(45) Date of Patent: Sep. 1, 2015

(54) ANIMAL LITTER COMPOSITION

(75) Inventors: Dragomir M. Bracilovic, Princeton, NJ (US); Lauren Ciemnolonski, Princeton, NJ (US); Mike Kelly, Plainsboro, NJ (US); Frederick Lawson, Somerset, NJ (US); Joseph A. Paluzzi, Hightstown, NJ (US); Zbigniew Senk, Bayonne, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 793 days.

(21) Appl. No.: 13/366,938

(22) Filed: Feb. 6, 2012

(65) Prior Publication Data

US 2013/0199456 A1   Aug. 8, 2013

(51) Int. Cl.
*A01K 29/00*   (2006.01)
*A01K 1/015*   (2006.01)

(52) U.S. Cl.
CPC ............. *A01K 1/0154* (2013.01); *A01K 1/0155* (2013.01)

(58) Field of Classification Search
CPC ........................... A01K 1/0154; A01K 1/0155
USPC .................................................. 119/172, 173
See application file for complete search history.

(56) References Cited

U.S. PATENT DOCUMENTS

| 4,671,208 | A | | 6/1987 | Smith |
| 4,704,989 | A | | 11/1987 | Rosenfeld |
| 5,359,961 | A | | 11/1994 | Goss et al. |
| 5,421,291 | A | | 6/1995 | Lawson et al. |
| 5,775,259 | A | * | 7/1998 | Tucker ........................ 119/173 |
| 5,860,391 | A | * | 1/1999 | Maxwell et al. .............. 119/173 |
| 5,901,661 | A | * | 5/1999 | Pattengill et al. ............. 119/173 |
| 6,294,118 | B1 | | 9/2001 | Huber et al. |
| 6,962,129 | B1 | | 11/2005 | Lawson |
| 7,429,421 | B2 | * | 9/2008 | Greene et al. ................. 428/403 |
| 7,665,418 | B2 | * | 2/2010 | Bracilovic .................... 119/173 |
| 2009/0255478 | A1 | * | 10/2009 | Wadams et al. ............... 119/173 |

* cited by examiner

*Primary Examiner* — Rob Swiatek
*Assistant Examiner* — Ebony Evans
(74) *Attorney, Agent, or Firm* — Fishman & Associates, LLC

(57) ABSTRACT

There is provided an absorbent composition for water-based liquids, wherein dusting normally associated with handling of powdered absorbent materials is significantly reduced. The composition can be an animal litter, such as cat litter. The composition is formed by mixing a filler with a de-dusting agent and spraying an aqueous slurry of a deodorizing agent onto the mixture. The mixture is then added to a water absorbing material such as clay to uniformly mix the deodorizing agent with the water absorbing material.

24 Claims, No Drawings

ANIMAL LITTER COMPOSITION

FIELD OF THE INVENTION

This invention relates to powdered absorbing compositions containing clay. More particularly it relates to absorbing compositions that can be used as animal litter such as cat litter. More specifically it relates to absorbing compositions such as cat litter, containing de-dusting and deodorizing agents and a method of forming same.

DESCRIPTION OF THE RELATED ART

Nowadays it is common that pet owners train their animals such as cats into a habit of urinating and defecating into a special litter pan containing powdered absorbent materials commonly known as litter. The pet owner later collects urine-saturated portions of the litter and feces. Similarly, caged animals such as guinea pigs use absorbent litter in their cages. The absorbent materials for this purpose often include discrete clay and filler particles. These small sized particles create dust. Dusting is one of the major negative attributes of handling powdered materials. The airborne dust usually consists of particles smaller than 25 microns and represents a minor portion of the litter, which is about equal or less than 1%. The major problem with handling cat litter occurs when it is being transferred from a box or a bag into the cat litter pan. The particles of powdered materials create airborne dust that is particularly noticeable and unpleasant to a person transferring the litter. Additionally, small particles become airborne when the animal attempts to cover the area of the litter that it used most recently and they are easily tracked out of the litter pan on the animal's paws ending up on the floor or the carpet or even a couch.

Clay and other particulates are common materials used in various animal litters (e.g. U.S. Pat. No. 4,671,208 to Smith, U.S. Pat. No. 4,704,989 to Rosenfeld, U.S. Pat. No. 5,359,961 to Goss et al., U.S. Pat. No. 6,294,118 B1 to Huber et al., and U.S. Pat. No. 5,421,291 to Lawson et al. and U.S. Pat. No. 6,962,129 to Lawson). No matter what the constituents of the compositions are, there remains the nuisance of the airborne dust.

Consequently, there is a need for an absorbing composition that would address the problem of dust associated with materials such as an animal litter. Such a composition would not be prone to dusting when handled and would include an inexpensive de-dusting agent that would be safe and non-irritating to the animal.

A composition comprising sodium bentonite, a mixture of limestone and dolomite or calcite and a de-dusting agent of guar gum has previously been produced by adding an aqueous solution of the guar gum to the limestone and dolomite mixture by spraying the guar gum solution onto the falling curtain of limestone and dolomite from a belt scale to a transfer screw conveyer. The transfer screw conveyer mixes the guar gum solution with the filler particles. The guar gum treated filler was then combined with the remaining ingredients, in particular, the sodium bentonite, to form the composition. Alternatively, powdered de-dusting agents were distributed on a moving bed of fillers, and water sprayed on the fillers/de-dusting agent mixture, so as to stick the de-dusting agent onto the filler. This method provides more de-dusting agent into the product. The addition of sodium bicarbonate particles to the composition, improves odor control of the animal litter.

SUMMARY OF THE INVENTION

The object of the invention is to provide an absorbent composition that includes a powdery material, which produces less airborne dust when handled, and has added odor control.

There is provided an absorbent composition for water-based liquids, wherein dusting normally associated with handling of powdered absorbent materials is significantly reduced. The composition can be an animal litter, such as cat litter. The composition comprises a water-absorbing material, a filler, a de-dusting agent, and an odor control agent.

A method of preparing the composition is also provided which allows for sufficient de-dusting agents to be readily included in the composition, and a composition having improved odor control.

DETAILED DESCRIPTION OF THE INVENTION

There is provided an absorbent composition for water-based liquids, wherein dusting normally associated with transferring of powdered absorbent materials is significantly reduced. The composition can be an animal litter, such as cat litter. The composition comprises an absorbent material, a filler, a de-dusting agent and an odor control agent. Bentonite clay can be used as the absorbent material and the preferred bentonite clay is sodium bentonite. The filler can be calcite, limestone, dolomite or a mixture of limestone with dolomite. A de-dusting agent can be guar gum, starch, fish glue, calcium chloride or other suitable materials. The preferred de-dusting agent is guar gum. The odor control agent is sodium bicarbonate.

One of the embodiments of the invention provides a cat litter composition that comprises an absorbent material in the amount of from about 25 to about 65 wt. %, filler in the amount of from about 35 to about 70 wt. %, guar gum in the amount of from about 0.1 to about 5 wt. %, sodium bicarbonate in amounts of from 0.05 to 5 wt. % and the balance optional components such as fragrance, colorants, antimicrobials etc.

Absorbent materials commonly used in animal litter are clays. The absorbent material constitutes from about 25 to about 65 wt. % of the composition. Alternative levels of absorbent material include 25 to 50 wt. %. It is preferred that the absorbent material clump when wetted as this allows the pet owner to remove only used portions of the litter, instead of discarding both used and unused portions, which would be wasteful and quite costly. Clumping absorbent material can be water-swellable clays that hydrate and consequently swell in the presence of water or non-water-swellable clays that are provided with an additional clumping agent or clump-enhancing material. This composition preferably comprises water-swellable bentonite clay as a clumping absorbent material. A water-swellable bentonite clay can be selected from the group consisting of sodium bentonite, potassium bentonite, lithium bentonite, magnesium bentonite or their combination. The water-swellable clay contains at least one water-swellable clay mineral. Such mineral can be a montmorillonoid or a smectite. Specific examples include montmorillonite, beidellite, nontronite, hectorite and saponite or their mixtures.

Absorbent material may also include non-clumping or non-water-swellable clays. The non-clumping bentonite clays of the present invention include calcium bentonite, sepiolite, Attapulgite clay, and Fuller's earth. If a non-water-swellable clay is used then clumping agents, or clump enhancing materials may be provided. Such materials include water-swellable clays, polysaccharides, water-soluble gums, dry particulate cellulosic ethers and water-absorbent polymers. Clumping agents and clump enhancing materials promote adhesion of the fine size particles of clay to each other as well as promote adhesion of the granules to form an agglomerate when wetted. Preferably the clumping agent allows the formation of a gelled agglomerate when exposed to a liquid, such as animal urine. Clay particle size suitable for animal litters ranges from about 25 microns to about 3350 microns in diameter.

The preferred bentonite clay of this invention is sodium bentonite. It contains a significant amount of montmorillonite mineral that has the ability to clump and harden after contact with an aqueous liquid such as urine. When contacted with water, the water molecules penetrate between the layers of crystal lattice structure causing interlayer or intra-crystalline swelling and expansion of the entire lattice. This causes the particles of the clayey component of the litter to conglomerate thereby making possible the removal of only that portion of the composition, which is swelled by urine or other aqueous waste liquid.

Calcite, limestone, dolomite or mixtures of limestone with dolomite can be used as fillers in the composition of this invention. The filler constitutes from about 35 to about 70 wt. % of the composition. Alternative levels of fillers include 45 to 70 wt. % and 50 to 70 wt. % of the composition. The addition of fillers reduces the cost of manufacture of the composition. Limestone, dolomite, calcite and dolomite with limestone can be used interchangeably for the purpose of this invention. Limestone and dolomite are common minerals occurring together. Limestone and calcite are primarily calcium carbonate ($CaCO_3$) while dolomite is primarily calcium magnesium carbonate ($CaMg(CO_3)_2$). When limestone and dolomite occur together naturally, the material is commonly known as dolomitic limestone. When in a crushed state they adsorb liquids on their surface but to a much smaller extend than do clay particles. Their primary role in an animal litter composition is to neutralize acids present in the animal's urine. Additionally they reduce the cost of litter as clayey materials are relatively expensive. Calcite, limestone and/or dolomite used in the present invention is crushed and sized to particles of from 8 U.S. mesh size to 45 U.S. mesh size. Larger particle sizes are not as absorbent as smaller because of the resultant reduction in the surface area/volume ratio. Variation in particle size within the composition is important as it provides small absorbent particles but also larger particles, which can help distribute the liquid by capillary action. As calcite, limestone and dolomite neutralize acids in the animal's urine, the odor emanating from a cat litter pan containing the litter is reduced. The reduction of the intensity of odor is possible as the acid present in urine reacts with the basic calcite, limestone or dolomite and thus the volatile organic acids odors are reduced.

The de-dusting agent of this composition can be guar gum, starch, fish oil, calcium chloride or other agents. Guar gum is a galactomannan, a carbohydrate polymer containing galactose and mannose units. It is primarily a ground endosperm of guar bean, *Cyamopsis tetragonolobus*, an annual legume. It is a water-soluble fiber that forms solutions of high viscosity and has film-forming and thickening properties. In this invention dry powdered guar gum is added to the limestone and/or dolomite fillers at levels to provide 0.05 to about 5 wt. % with respect to the weight of the completed composition. The de-dusting agent of this invention is preferably at least partially water soluble.

The composition can be formed by evenly distributing the guar gum powder onto a moving bed of the filler on a belt conveyer. Water is then sprayed onto a falling curtain of the filler/gum mixture so as to stick the guar gum to the filler particles. The filler/gum mixture is then blended with the absorbent. The amount of water added is about up to 4 wt % of the filler/gum mixture, typically up to about 2 wt %.

Starches, modified starches and dextrins have also been contemplated as de-dusting agents for the animal litter. Starches that can be used include starch from potato, tapioca, corn, wheat, sorghum, rice, barley and their combinations. Starches are gelatinized by heating starch water solution above the gelatization temperature of the particular starch. Aqueous solutions of gelatinized starch are sprayed into the filler and the mixing step follows. Starch treated filler is then combined with the remaining ingredients of the cat litter.

Dextrins are low-molecular-weight carbohydrates, polymers of D-glucose characterized by $\alpha(1-4)$ linkage, produced by the hydrolysis of starch. Amylases are the enzymes usually used in the hydrolysis of starch. Dextrins are intermediate in complexity between starch and maltose, and produce aqueous solutions of lower viscosity compared to the original starch. The viscosity of the solution depends on the length and branching of the chain. After an aqueous solution of dextrin is sprayed into the filler and mixed with it, the dextrin treated filler is combined with the remaining ingredients of the composition.

Additional de-dusting agents contemplated for this invention include fish glue and calcium chloride. Fish glue is protein colloid glue derived from fish parts, formed through hydrolysis of collagen from fish tissues. The hydrolysis can be conducted in hot water or dilute acid to form soluble gelatin. Solutions of gelatin are liquid at room temperature and make very good coating vehicles. The hygroscopic calcium chloride ($CaCl_2$) is an effective de-dusting agent as well. Water solutions of these de-dusting agents are added to the filler prior to the step of combining it with other ingredients of the composition. Other de-dusting agents, including other polysaccharides, for example locust bean gum, can also be used in the composition of this invention.

The absorbing composition of this invention also comprises a solid particulate deodorizing agent, for example sodium bicarbonate or potassium bicarbonate. Sodium bicarbonate in a compacted or powdered form is a known deodorizing agent. The powdered sodium bicarbonate is compacted into sheets and then broken into granules. Such deodorizing agent may be present in amounts of 1 to 5 wt. % of the total composition. Particle size of compacted sodium bicarbonate in the composition of this invention ranges from about 600 to about 3,300 microns. To ensure its deodorizing effect, its particles can be coated with mineral oil and agglomerated with a powdered siliceous material to prevent them from wicking and dissolving into the aqueous phase of the animal waste deposited in the litter. Any commercial grade of sodium bicarbonate may be used in the preparation of the deodorizing agent. The size of the particles of sodium bicarbonate may be within the range of from about 20 to about 400 U.S. mesh size, preferably about 40 to about 140 U.S. mesh size and have a purity of at least about 90 wt. %, preferably at least about 99 wt. %. Any commercially available mineral oil may be used in coating sodium bicarbonate particles so that it sticks to the base material without segregating. The amount of mineral oil used is generally in the range of from about 0.1 to about 2.0 wt. %, preferably from about 0.5 to about 1.0 wt. % based on the weight of sodium bicarbonate. The powdered siliceous material may be for example perlite or vermiculite. For example, expanded perlite utilized in this invention may have a bulk density in the range of from 50 to 300 g/l, preferably from about 70 to about 150 g/l and a particle size of from about 20 to about 400 U.S. mesh size, preferably about 50 to about 200 U.S. mesh size. It may be present in the amount of from about 0.5 to about 20 wt. %, preferably from about 1 to about 5 wt. % based on the total weight of the deodorizing agent of the composition.

In a preferred embodiment, a deodorizing agent such as sodium bicarbonate is added to the composition by inclusion of such deodorizing agent in the water sprayed onto the filler/de-dusting agent mixture, as described above. For example, an aqueous slurry containing 1 to 10 wt. % sodium bicarbonate, can be sprayed onto the solid mixture of filler and de-dusting agent, such as guar gum. The wetted filler/gum mixture is then blended with the absorbent. By this method, the composition will contain about 0.05 to 5 wt. % deodorizing agent, such as sodium bicarbonate. It has been found that the sodium bicarbonate is evenly distributed throughout the composition on each absorbent particle, as the guar gum solution dries. The residual sodium bicarbonate is either glued onto the filler, or absorbed by the absorbent. Surprisingly, it has been found that this surface type coating on the absorbent particles neutralizes acidic odors better than the addition of the compacted sodium bicarbonate particles. Thus, it has been found that a composition containing about 0.1% sodium bicarbonate, added by the preferred method, neutralized acidic odors as well as a composition containing 1.5 wt. % of the compacted sodium bicarbonate.

The composition of the present invention may also include a coloring agent. Painted particles provide speckles for the litter, helpful in locating small amounts of the litter when it is carried on the animal's paws and is left in a place away from the litter pan and to locate the clumps of the used litter in the litter pan. If the composition includes coloring, the non-water absorbing particles are painted. These can include for example filler particles, such as limestone and/or dolomite particles. Paint used in producing the painted particles may include paints of any kind and any color. Suitable paints include any type of pigment or dye additive enclosed within a binder vehicle such as oil or resin. Polymer aqueous-based latex paints are the paints preferred for this invention. The pigment and dyes disposed in the vehicle are preferably non-water soluble when the paint is dry so that particles once painted are colorfast, and do not interfere with the function of the non-painted water absorbent materials. The amount of painted particles in the litter can be about 0.1-20 wt. % or more of the animal litter. Blue latex paint is one of the coloring agents that can be used in this invention.

The composition of this invention further comprises fragrance in the amount of from about 0.01 to about 0.2 wt. % based on the total weight of the composition. The fragrance ingredient may be in a powdered "fragrance preblend" form, comprising a pleasant smelling oily liquid or perfume oil absorbed on particles of a fragrance carrier having a high surface to volume ratio, such as any of a group of siliceous or other materials well known in the art such as dimorphous silicas or starches, or in a liquid form that may be directly sprayed onto the clay/dolomite/limestone/calcite base mixture. The perfume oil may comprise essential or synthetic oils that are known in the art to provide a pleasant smell as well as to a certain extent mask unpleasant odors. The perfume oil may be present in the amount of from about 25 to about 70 wt. % based on the total weight of the oil and the carrier. The particle size of the fragrance carrier can be in the range for example from 50 to 400 U.S. mesh size. If the composition includes painted particles the fragrance could be added to the painted particle during the painting of the particle or after the particle is painted and dried.

EXAMPLE 1 (PRIOR ART)

The absorbing composition of this invention was tested with respect to the amount of airborne dust produced. Amounts of airborne dust can be quantified as opacity percent. The opacity meter was used for dust quantification of the composition of this invention. It consisted of a plastic 24" high cylinder having a 5" diameter and openings at 3" from the bottom of the cylinder, at opposite sides of the cylinder. The cylinder was fitted with a base at the bottom and a cover at the top. The cover had an opening in the center, a slide gate and a 600 ml funnel. The light beam was sent through the opening on one side to the opening on the opposite side of the cylinder where the sensor was located. If the light path is clean with no dust present the opacity reading is 0%.

A sample is dosed from the funnel by opening the slide gate, causing the litter to drop to the bottom of the cylinder. The energy of the fall creates a dust cloud, which partially blocks the light path. The percent opacity is proportional to the extent of the light path blockage. The opacity may be expressed as a time dependent curve or, for simplicity, a specific time interval may be chosen and only one point of the curve is reported as opacity percent. Based upon the behavior of the cat litter airborne dust a 30 second point was chosen as the most representative for opacity readings.

The lab tests were conducted using several different de-dusting agents. The samples were prepared using a lab scale attritor. 500 ml batch sizes were prepared by adding 1 wt. %, 2 wt. %, 4 wt. % and 8 wt. % of 1% guar gum solution to dolomite. The dolomite with guar gum was then mixed with bentonite clay, sodium bicarbonate and fragrance. The samples were tested with dolomite present in the amount from 20 to 60 wt. %. Samples without guar gum solution were also prepared. The opacity of the samples was tested one hour after the final product was made. The opacity was reduced up to 70% when compared to the same cat litter without the guar gum addition. Doubling the amounts of the guar gum solution improved the opacity results slightly. Unexpectedly the reduction of opacity due to the presence of guar gum improved with storage.

EXAMPLE 2 (PRIOR ART)

Ribbon blender with 140 lb batch size was used to make complete cat litter formula and pack it into 14 lb cartons. Induction of guar gum into water was accomplished using in line homogenizers designed especially for mixing highly hydrating powders with water. Opacity was measured as in Example 1. Tests were performed with cat litter comprising between 20 wt. % and 60 wt. % dolomite, and 2 wt. %, 4 wt. %, and 8 wt. % of 1% guar gum solution. Opacity reduction compared to that of the samples without de-dusting additives was similar to the results in Example 1. Increase of the amount of the guar gum solution from 4 wt. % to 8 wt. % reduced the opacity of the final cat litter product slightly.

EXAMPLE 3 (PRIOR ART)

Production tests were performed with a composition containing 20 wt. of dolomite, 2 wt. % of 1% guar gum solution, and 4 wt. % of 1% guar gum solution. Induction of guar gum into water was achieved using in line homogenizers designed especially for mixing highly hydrating powders with water. The guar gum solution was sprayed into the falling curtain of dolomite from a belt scale to the transfer screw conveyor. The transfer screw conveyor provided sufficient mixing to totally eliminate airborne dust from dolomite by reducing the opacity to 0%. As in Examples 1 and 2, guar gum also reduced the opacity of other cat litter ingredients subsequently mixed with the guar gum treated dolomite, resulting in lower opacities of the finished product. After seven days samples of the finished product had an increased opacity reduction from the initial 63% to 90%.

Similar test with "fish glue" and 25% calcium chloride added to the cat litter samples were also conducted and the improvement of opacity reduction that was achieved was similar to that when the samples contained guar gum. Other polysaccharides such as starch and dextrin were also successfully lab tested. Additionally, clumping of samples with de-dusting additives was equal or better than that of original samples without additives.

EXAMPLE 4 (PRIOR ART)

When the percentage of dolomite was increased to 50% of the composition, adding a guar gum solution was insufficient to reduce dolomite opacity to 0%. Accordingly, a new method of adding the guar gum to the dolomite was required to reduce opacity to 0% in the mixture.

Production tests were conducted with a composition containing 50% of dolomite, 0.1% of powdered −400 micron guar gum and 2% water. The powdered guar gum was evenly distributed via a gravimetric feeder onto a moving bed of dolomite on a belt conveyor moving at a rate to ensure a 50% mix into the product. Water was sprayed onto a falling curtain of the dolomite/guar gum mixture which was transferred into a transfer/mixing screw conveyor. The transfer screw conveyor provided sufficient mixing to eliminate any airborne dust associated with the incoming dolomite, reducing the opacity to 0%. The dolomite/guar gum mixture was fed into a screw conveyor containing sodium bentonite clay at a rate to ensure 50% dolomite. The addition of guar gum also reduced the opacity of the sodium bentonite clay which contained some airborne dust of its own, resulting in a significant overall reduction of airborne dust in the finished product. After 7 days, samples of finished product had an increased opacity reduction form an initial 60-70% range to 90-95%.

EXAMPLE 5

In a separate vessel, prepare a 5% solution of sodium bicarbonate in water. The sodium bicarbonate will function as a deodorizing agent in the product. To a quantity of limestone, dolomite or calcite, add 0.25% powdered guar gum (200 mesh or 400 mesh) and mix thoroughly. To this mixture, add 3.5% of the baking soda solution and mix thoroughly. The mixture of guar gum and the 5% sodium bicarbonate solution will function as an adhesive on the surface of the limestone, dolomite or calcite adhering dust particles. Add 50% of this mixture to 50% sodium bentonite clay and mix thoroughly. Dust particles residing in the sodium bentonite will also adhere to the guar gum/5% sodium bicarbonate solution on the surface of the limestone, dolomite or calcite.

What is claimed is:

1. A method of preparing a pet litter composition which has reduced dusting during handling, comprising 1) forming a first dry mixture consisting essentially of thoroughly mixing a powdered de-dusting agent that is selected from the group consisting of guar gum, starch, calcium chloride and mixtures thereof, with filler particles that are selected from the group consisting of calcite, limestone, dolomite and mixtures thereof, 2) adding an aqueous slurry of a deodorizing agent in the amount of 0.5 to 5 wt. % to said first dry mixture to stick said de-dusting agent to said filler particles to form a second mixture, and 3) mixing said second mixture with a dry water absorbing particulate material to form the pet litter composition.

2. The method of claim 1, wherein said dry water absorbing particulate material is a clumping or non-clumping clay.

3. The method of claim 1, wherein said de-dusting agent is guar gum.

4. The method of claim 1, wherein said dry water absorbing particulate material is a clumping bentonite clay, said de-dusting agent is guar gum, and said deodorizing agent is sodium bicarbonate.

5. The method of claim 4, wherein said bentonite clay comprises about 25 to about 65 wt. %, said filler particulate comprises about 35 to about 70 wt. %, guar gum comprises about 0.1 to 5 wt. %.

6. The method of claim 1, wherein said deodorizing agent is sodium bicarbonate.

7. The method of claim 6, wherein said sodium bicarbonate comprises 1 to 10 wt. % of said slurry.

8. The method of claim 7, wherein said sodium bicarbonate comprises 3 to 8 wt. % of said slurry.

9. The method of claim 1, wherein said composition includes a colorant, antimicrobial and/or a fragrance.

10. An absorbing composition for water-based liquids made by the method of claim 1.

11. The absorbing composition for water-based liquids of claim 10, wherein bentonite clay is the absorbent material.

12. The absorbing composition for water-based liquids of claim 11, wherein the bentonite clay is sodium bentonite.

13. The absorbing composition for water-based liquids of claim 10, wherein the filler is present in the amount of from about 45 wt % to about 70 wt. %.

14. The absorbing composition for water-based liquids of claim 10, wherein the deodorizing agent is present in the amount of from about 0.05 wt. % to about 5 wt. %.

15. The absorbing composition of claim 14, wherein the deodorizing agent is sodium bicarbonate.

16. The absorbing composition of claim 10, wherein a coloring agent is present in the amount of from about 0.05 wt. % to about 0.1 wt. % of the composition.

17. The absorbing composition of claim 10, wherein a fragrance is present in the amount of from about 0.05 wt. % to about 0.2 wt. % of the composition.

18. The absorbing composition of claim 10, wherein the absorbent material is clumping clay.

19. The absorbing composition of claim 18, wherein the clumping clay includes at least one of potassium bentonite, lithium bentonite, or magnesium bentonite.

20. The absorbing composition of claim 10, wherein the absorbent material includes a non-clumping clay.

21. The absorbing composition of claim 20, wherein the absorbent material further includes a clumping agent.

22. The absorbing composition of claim 20, wherein the non-clumping clay includes at least one of calcium bentonite, sepiolite, Attapulgite clay and Fuller's earth.

23. The absorbing composition of claim 10, wherein said filler particles are selected from the group consisting of calcite, limestone, dolomite and mixtures thereof.

24. The absorbing composition of claim 10, wherein said de-dusting agent is guar gum.

* * * * *